Figure 3:
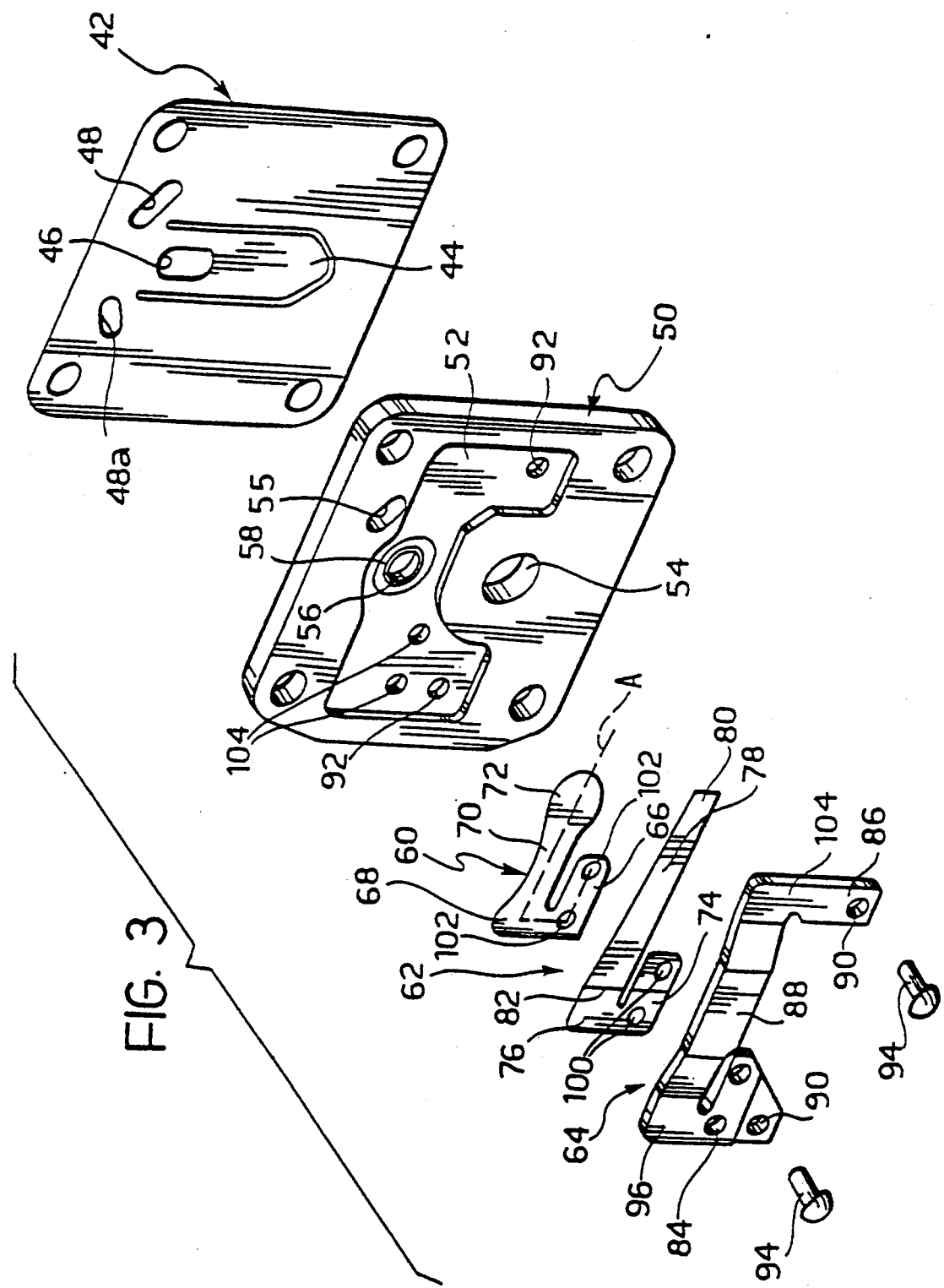

United States Patent [19]

Peruzzi et al.

[11] Patent Number: 5,110,272
[45] Date of Patent: May 5, 1992

[54] VALVE UNIT FOR A RECIPROCATING COMPRESSOR FOR REFRIGERATORS AND THE LIKE

[75] Inventors: Federigo Peruzzi; Norbert Andrione, both of Turin, Italy

[73] Assignee: Aspera S.r.l., Turin, Italy

[21] Appl. No.: 651,395

[22] Filed: Feb. 7, 1991

[30] Foreign Application Priority Data

Jun. 7, 1989 [IT] Italy ............................ 67453 A/89

[51] Int. Cl.⁵ .............................................. F04B 21/02
[52] U.S. Cl. ................................. 417/571; 137/856; 137/857
[58] Field of Search ............... 417/569, 571; 137/856, 137/857

[56] References Cited

U.S. PATENT DOCUMENTS

| | | | |
|---|---|---|---|
| 2,019,747 | 12/1931 | Taylor | 417/571 |
| 2,970,608 | 6/1958 | Doeg | 417/569 |
| 3,039,487 | 9/1960 | Doeg | 417/569 |
| 4,524,806 | 6/1985 | Romer | 137/857 |

Primary Examiner—Richard A. Bertsch
Assistant Examiner—Charles Freay
Attorney, Agent, or Firm—Sughrue, Mion, Zinn, Macpeak & Seas

[57] ABSTRACT

The valve unit includes a valve plate fitted to a head end of the cylinder of the compressor and having a valve-controlled intake part and an exhaust port surrounded by an annular seat formed in an opposite face of the plate from that which faces the cylinder, an exhaust valve reed associated with the seat, and a limit device fixed to the plate for limiting the travel of the exhaust reed. The exhaust reed includes a base portion which is restrained on the plate, an obturating head portion spaced from the base portion and cooperating with the seat, and an elongate portion connected the base and head portions. The connecting portion is "L"-shaped in plan with the head portion situated at the end of the leg of the "L" and the base portion situated at the end of the foot of the "L". The foot of the "L" is free to bend with the leg of the "L".

8 Claims, 4 Drawing Sheets

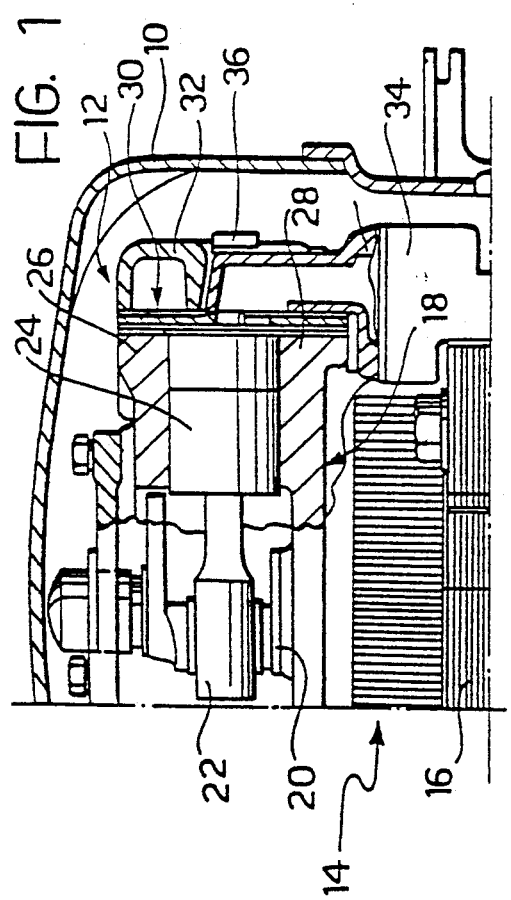
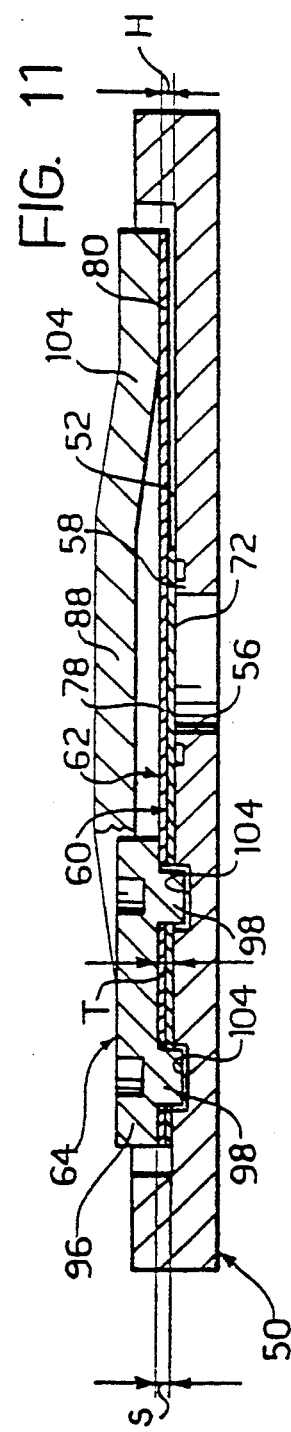
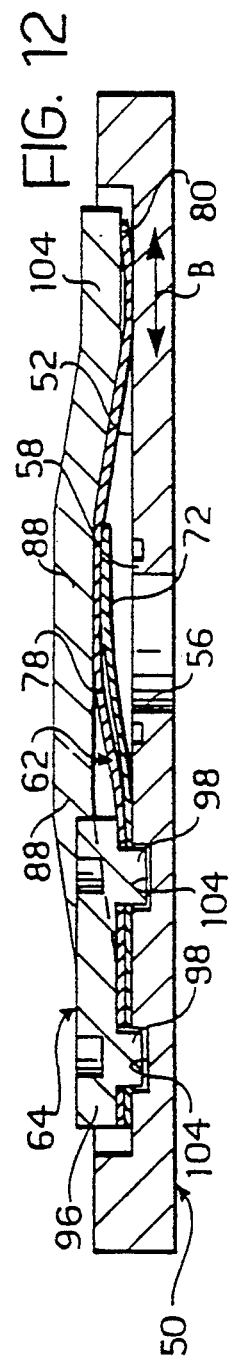

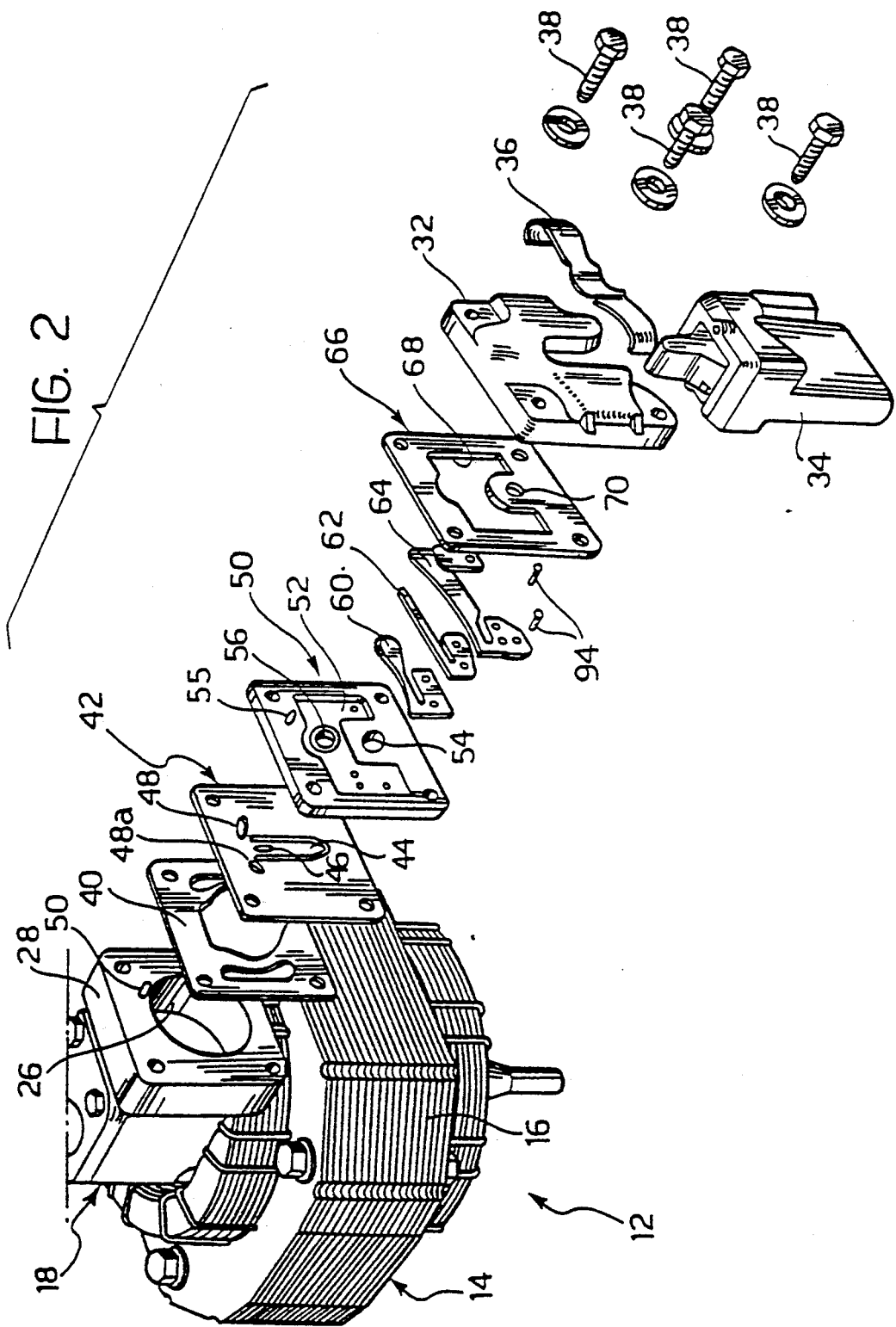

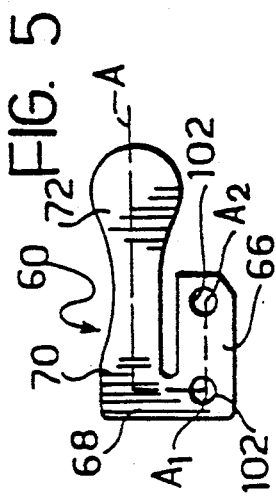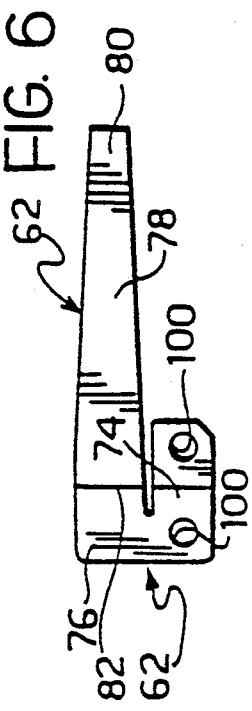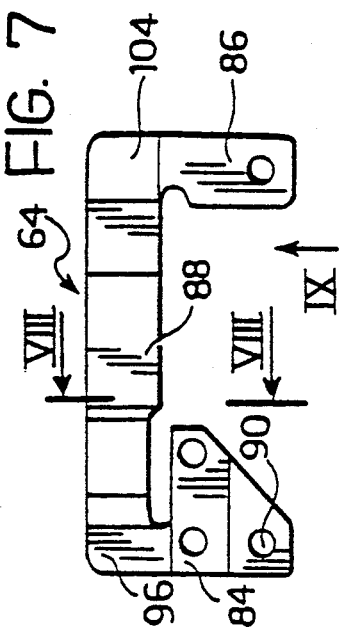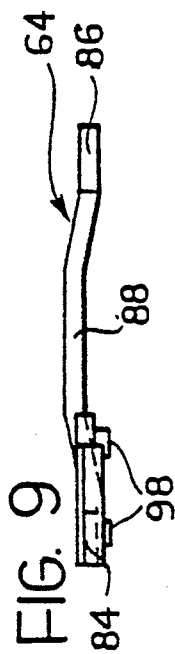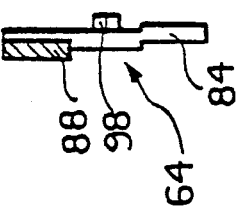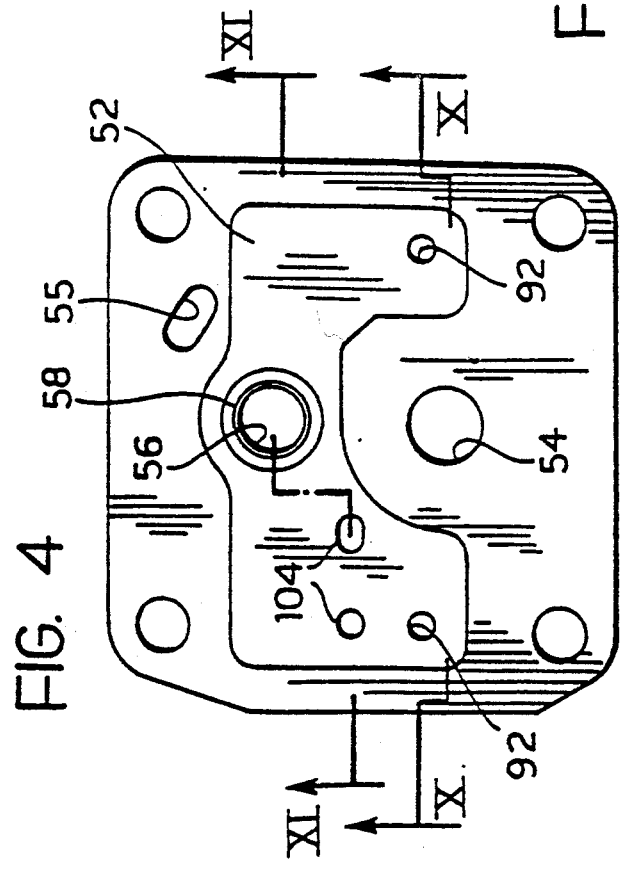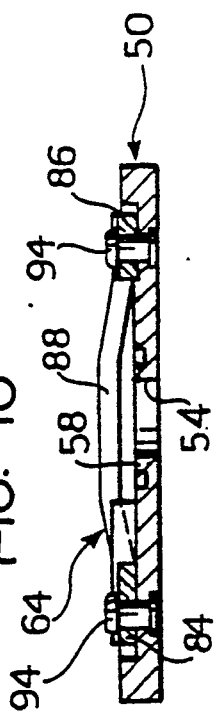

VALVE UNIT FOR A RECIPROCATING COMPRESSOR FOR REFRIGERATORS AND THE LIKE

The present invention relates to a valve unit for a reciprocating compressor with a cylinder and a piston for refrigerators and the like, according to the preamble of claim 1.

A valve unit of the type in question is known from the document U.S. Pat. No. 4,642,037 and includes an exhaust valve reed with a base portion fixed to the valve plate by means of rivets. One of these rivets is substantially on the longitudinal axis of the valve reed.

In this known solution, the valve reed behaves like a beam which is fixed at its end remote from the obturator head.

This type of exhaust valve has the advantage of using an exhaust valve reed of quite small mass, which means it has quite a rapid response. The flexibility of the valve reed, however, is quite limited since the length of the cantilevered beam which constitutes it cannot be increased beyond a certain limit without increasing the size of the valve unit to an unacceptable extent in the direction in which the valve reed extends.

As is known, in a reciprocating compressor, it is desirable to reduce the cross-section of the port of the exhaust valve as much as possible, in order on the one hand to reduce the residual clearance "volume" in the compression chamber to a minimum, to the benefit of the volumetric efficiency of the compressor, and on the other hand to enable a corresponding reduction in the dimensions of the head portion of the valve reed which cyclically closes the exhaust seat, to make it more silent.

The smaller the section of the exhaust port, however, the greater must be the flexibility of the valve reed, that is, the further its head portion must travel to open. In other words, the advantages afforded by an exhaust port of small cross-section would be reduced or cancelled out since, with the travel of the head portion of the reed, it is impossible to achieve a section of opening such as to reduce as much as possible the losses of pressure due to the passage of the gas and hence the compression energy of the gas.

The object of the invention is to provide a valve unit of the type in question, including a very flexible exhaust valve reed which provides a large section of opening for the exhaust without giving rise to an unacceptably bulky unit, thus enabling full use to be made of the advantages of an exhaust port of small cross-section.

According to the present invention, this object is achieved by means of a valve unit as defined in the characterising part of claim 1 and in the subsequent claims.

In a valve unit according to the invention, the bending axis of the exhaust valve reed is constituted by at least the sum of the lengths of the leg and the foot of the "L". In other words, compared with the prior art, the bending length of the reed is increased at least by an amount corresponding to the foot of the "L". Since the part of the reed which corresponds to the foot of the "L" is at right angles to the rest of the reed, other conditions remaining the same, the size of the valve unit is not substantially increased in comparison with the size of an equivalent prior-art unit in which the bending length of the exhaust valve blade is limited to the distance of the head part from the foot part.

Further features and advantages of the invention will become clear from the detailed description of a preferred embodiment which follows with reference to the appended drawings, in which:

FIG. 1 is a partially-sectioned, partial elevation of a hermetic compressor for refrigerators and the like incorporating the valve unit according to the invention, FIG. 2 is an exploded perspective view of the compressor and the valve unit, FIG. 3 is another exploded perspective view of the main parts of the valve unit, on an enlarged scale, FIG. 4 is a front view of the valve plate of the unit, FIG. 5 is a front view of the exhaust valve reed of the unit, FIG. 6 is a front view of a leaf spring associated with the exhaust valve reed, FIG. 7 is a front view of a device for limiting the opening of the exhaust valve reed, FIG. 8 is a cross-section thereof taken in the plane indicated VIII—VIII of FIG. 7, FIG. 9 is a view of the limiting device taken on the arrow IX of FIG. 7, FIG. 10 is a cross-section of the assembled unit formed by the elements of FIGS. 4 to 7, taken as indicated at X—X in FIG. 4, FIG. 11 is a greatly enlarged cross-section of the unit of FIG. 10 taken on the broken line XI—XI of FIG. 4 with the exhaust valve closed, and FIG. 12 is a section corresponding to FIG. 11, in which the exhaust valve is shown completely open.

FIGS. 1 and 2 show some parts of a hermetic motor-compressor of the type described and illustrated in the document IT-A-88 67012 laid open to public inspection on Jul. 12, 1989, to which reference should be made for further details.

With reference to FIGS. 1 and 2, the motor-compressor includes a hermetic casing 10 which houses the motor-driven compressor proper, generally designated 12.

The compressor 12 includes an electric motor 14 with a stator pack 16. The stator pack 16 is suspended in the casing 10.

The housing 18 of a reciprocating compressor is fixed to the upper end of the stator pack 16. A crankshaft 20 is supported for rotation in the housing 18 and a connecting rod 22 is connected thereto. The connecting rod 22 is coupled in turn to a horizontal piston 24 which is slideable in a cylinder 26 formed in the housing 18.

The cylinder 26 terminates in a head end constituted by a flange 28 which is substantially square in plan.

A head unit or valve unit, indicated 30 in FIG. 1, is fixed to the flange 28 and will be described in detail below.

An exhaust manifold head 32 and an intake silencer 34 coupled to the head by a clip 36 are associated with the valve unit 30, all as described and illustrated in the said document IT-A-88 67012.

With reference now to the valve 30, this is constituted by an assembly of elements of which the main ones are shown together in FIG. 3 and individually in FIGS. 4 to 9.

This assembly is fixed to the flange 28, together with the manifold head 32, by means of screws 38.

From left to right in FIG. 2, the unit 30 includes a pack of plate elements all having substantially the same square outline as the flange 28. The first of these elements, indicated 40, is a gasket. The second element, indicated 42, is a thin steel valve plate in which, amongst other things, an intake valve reed 44 is formed. An exhaust aperture 46 is formed in a base portion of the reed 44 and communicates with the interior of the cylinder 26.

The valve plate 42 also has two apertures 48, 48a. One of these apertures, indicated 48, communicates with an exhaust duct 55 which, in known manner, leads from the front face of the flange 28 to an exhaust silencer. The other aperture 48 serves to enable the plate 42 to be mounted in either of two positions at 180°.

The third element of the pack is a relatively thick valve plate 50. The plate 50 is preferably of sintered steel.

The plate 50 has a "C"-shaped recess 52 in its face opposite that which faces the valve plate 42.

The plate 50 has an inlet port 54 with which the intake valve reed 44 cooperates in known manner, as well as an aperture 55 which enables communication between the interior of the manifold head 32 and the aperture 48 in the flange 28.

An exhaust port 56 is situated in the centre of the recess 52 and communicates with the interior of the cylinder 26 through the aperture 46 of the intake valve reed 44.

The port 56 in the recess 52 is surrounded by the usual annular projection 58 which acts on the exhaust valve seat.

The recess 52 houses, in succession from left to right in FIG. 2 and from right to left in FIG. 3, an exhaust valve reed 60, a damping blade spring 62, and a means 64 for limiting the opening. Further details of these elements 60, 62, 64 will be given below.

A fourth element of the pack is constituted by a flat washer 66 (FIG. 2) with an aperture 68 of a "C"-shape corresponding to that of the recess 52. The washer 66 also has an aperture 70 for communication between the inlet port 54 and the silencer 34.

The elements 60, 62 and 64 which constitute the essential parts of the exhaust valve unit will now be described. For this description, reference will be made first to FIGS. 3 to 10 and then to FIGS. 11 and 12.

The exhaust valve reed 60 is of thin sheet steel and is generally "U"-shaped in plan. A smaller arm of the "U" is formed by a base portion 66 which is restrained in the recess 52 of the valve plate 50 in the manner which will be specified below. Following on from the base portion 66, in succession, a portion 68 corresponding to the cross member of the "U" and a longer arm of the "U" are formed by blanking. The longer arm, which extends parallel to and alongside the base portion 66, includes a connecting portion 70 with a double taper and a drop-shaped head portion 72 which constitutes an obturator and cooperates with the valve seat 58 in the plate 50.

The spring 62 associated with the valve reed 60 is also of blanked sheet steel. Its function, which is known, is to increase the resistance to bending of the reed 60 towards the end of its opening stroke. The spring 62 may be omitted from certain embodiments.

The blade spring 62 has a similar shape to the valve reed 60. In particular, it has a base portion 74 which corresponds to the base portion 76, a cross member 76 which corresponds to the cross member 68, and an elongate tapered portion 78 which corresponds to the connecting portion 70 and the head portion 72 of the valve reed 60. For the reasons which will be specified below, the elongate portion 78 extends beyond the head portion 72 of the valve reed 60. The free end of the elongate portion 78 is indicated 80.

A bend 82 is formed at the end of the elongate portion 78 of the spring 62 and in a central region of its base portion 74 and serves to preload the spring 62 so as to ensure that its elongate portion 78 is constantly against the connecting portion 70 and the head portion 72 of the valve reed 60.

The travel-limiting means is constituted by a rigid pressed- or sintered-steel element and in plan has a "C"-shape corresponding to that of the recess 52. In particular, the limiting means 64 comprises two arms 84, 86 and a yoke 88. Near their ends remote from the yoke 88, the arms have respective holes 90 which correspond with through-holes 92 formed in the valve plate 50.

As illustrated in FIG. 10, amongst others, respective rivets 94 extend through the holes 90, 92 and fix the limiter 64 securely in the recess 52 of the plate 50 with the interposition of the valve reed 60 and its spring 62.

The arm 84 of the limiting device 64 has a region 96 of connection to the yoke. For the purpose which will be made clear below, a space S wider than the combined thickness T of the valve reed 60 and the spring 62 is left between the connecting region 96 and the base of the recess 52 (FIG. 11).

In the connecting region 96, the limiting means 64 has a pair of bosses 98 (FIGS. 11 and 12) which extend through corresponding holes 100 and 102 and are engaged in corresponding seats or recesses 104 formed in the base of the recess 52. The bosses 98 keep the valve reed 60 and its spring 62 in the correct position by means of their respective base portions 66 and 74.

The end of the yoke 88 corresponding to the other arm 86' of the limiting device 64 is similarly offset as shown at 104 so that a space H wider than the thickness of the spring 62 is left between the end and the base of the recess 52 (FIG. 11).

The central portion of the yoke 88 is offset away from the base of the recess 52, projects therefrom, and is housed in the exhaust manifold 32.

In FIGS. 3 and 5, the bending axis of the valve reed 60 is indicated A. As can be seen, the axis A has at least one "L"-shaped portion which corresponds to the leg of the "L" constituted by the head portion 72 and the connecting portion 70, as well as to the foot of the "L" constituted by the cross member 68. The valve reed 60 can therefore bend at least from the head portion 72 up to the point indicated $A_1$ in FIG. 5, which corresponds to the first hole 102 on the left in FIGS. 3 and 5.

By virtue of the difference between the dimensions T-S (FIG. 11), the base portion 66 of the valve reed 60 is floating so that its bending length can be considered to correspond to the distance along the broken axis A between the head portion 72 and the point $A_2$ corresponding to the second, right-hand hole 102 in FIGS. 3 and 5.

Similar considerations are true of the spring 62.

In FIG. 11, the head portion 72 of the valve reed 60 is against its seat 58 and the exhaust valve is closed. The corresponding elongate part 78 of the spring is against the head portion 72 of the valve reed 60.

In FIG. 12, the valve reed 60 is shown in the completely open condition in which it is furthest from its seat 58. The distance of the obturator head portion 72 of the reed 60 from the seat 58 is quite large because of the offset configuration of the central portion of the yoke 88.

As can be seen in FIG. 12, a corresponding portion of the spring 62 is interposed between the yoke 88 and the obturator head portion 72. Constant contact is ensured between the elongate part 78 of the spring 62 and the obturator head portion 72: in fact, the free end 80 of the spring 62 is interposed between the corresponding region 104 of the limiter 64 and the base of the recess 52 with clearance H (FIG. 11). This free end 80 can move in the directions of the double arrow B (FIG. 12) to enable the elongate part 78 of the spring 62 to bend but is fixed in practice so that, to advantage, the elongate portion 78 behaves like a leaf spring. The sliding of the end 80 in its slot between the region 104 and the base of the recess 52 also generates a frictional force which, added to that of the head portion 72 of the valve reed 60 against the elongate portion 78 of the spring 62, opposes undesirable flutter of the head portion 72.

We claim:

1. A valve unit for a reciprocating compressor with a cylinder and a piston for refrigerators and the like, comprising a valve plate (50) fitted to a head end (28) of the cylinder (26) of the compressor and having an intake port (54) with a valve and an exhaust port (56) surrounded by an annular seat (58) formed in an opposite face of the plate (50) from that which faces the cylinder (26), an exhaust valve reed (60) associated with the exhaust seat (58) and travel-limiting means (64) fixed to the valve plate (50) for limiting the travel of the exhaust valve reed (60), in which the exhaust valve reed (60) comprises a base portion (66) which is restrained on the plate (50), an obturator head portion (72) which is spaced from the base portion (66) and cooperates with the seat (58), and an elongate portion (68, 70) which connects the base portion (66) and the head portion (72), characterised in that the connecting portion (68, 70) is "L"-shaped in plan with the head portion (72) situated at the end of the leg (70) of the "L" and the base portion (66) situated at the end of the foot (68) of the "L", the foot (68) of the "L" being free to bend with the leg (70) of the "L".

2. A valve unit according to claim 1, characterised in that the base portion (66) of the exhaust valve reed (60) extends from the foot (68) of the "L" alongside and parallel to the leg (70) of the "L" so that the valve reed (60) is generally "U"-shaped in plan with a shorter arm formed by the base portion (66), a cross member (68) formed by the foot of the "L", and a longer arm formed by the leg (7)) of the "L" and the head portion (72).

3. A valve unit according to claim 1, characterised in that it includes a blade spring (62) interposed between the valve reed (60) and the travel-limiting means (64) and similar in shape to the valve reed (60), the spring having a base portion (74) which is restrained on the plate (50) together with the base portion (66) of the valve reed (60) and an elongate portion (78) corresponding to the connecting portion (70) and the head portion (72).

4. A valve unit according to claim 3, characterised in that the travel-limiting means (64) is a rigid element which is "C"-shaped in plan with two arms (84, 86) and a yoke (88), in which the arms (84, 86) have end portions fixed to the valve plate (50) and one of the arms (84) has a region (96) for connection to the yoke (88), said region (96) being offset and restraining the base portions (66, 74) of the valve reed (60) and the spring (62) so that they float between it and the plate (50).

5. A valve unit according to claim 4, characterised in that the yoke (88) of the limiting means (64) is further offset away from the valve plate (54) so as to increase the travel of the valve reed (60) and the spring (62).

6. A valve unit according to claim 4, characterised in that the elongate portion (78) of the spring (62) is extended beyond the head portion (72) of the valve reed (60) by a free end (80) which is slideably interposed between the valve plate (50) and a corresponding offset end region (104) of the yoke (88) of the limiting means (64).

7. A valve unit according to claim 4, characterised in that the offset connecting region (96) of the travel-limiting means (64) has at least one locating boss (98) which extends through corresponding holes (100, 102) in the base portions (66, 74) of the valve reed (60) and the spring (62) and is fixed in a corresponding seat (104) in the valve plate (52).

8. A valve unit according to claim 1, characterised in that the valve plate (50) has a recess (52) for housing the exhaust valve reed (60), any spring (62) thereof, and the travel limiting device (64).

* * * * *